United States Patent
Zhou et al.

(10) Patent No.: US 8,666,249 B2
(45) Date of Patent: Mar. 4, 2014

(54) METHOD, DEVICE, AND SYSTEM FOR IMPLEMENTING LR-PON

(75) Inventors: Huiyu Zhou, Guangdong (CN); Teng Ma, Guangdong (CN); Kun Huang, Guangdong (CN); Zhiyun Chen, Guangdong (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 315 days.

(21) Appl. No.: 13/098,005

(22) Filed: Apr. 29, 2011

(65) Prior Publication Data

US 2011/0206372 A1    Aug. 25, 2011

Related U.S. Application Data

(63) Continuation of application No. PCT/CN2009/072054, filed on May 31, 2009.

(30) Foreign Application Priority Data

Nov. 3, 2008    (CN) .......................... 2008 1 0226005

(51) Int. Cl.
*H04J 14/00*    (2006.01)

(52) U.S. Cl.
USPC ................................. 398/64; 398/58; 398/62

(58) Field of Classification Search
USPC ......................... 398/52, 58, 94, 97–99, 62–64
See application file for complete search history.

(56) References Cited

U.S. PATENT DOCUMENTS

| | | | |
|---|---|---|---|
| 5,576,876 A | 11/1996 | Takeyari et al. | |
| 2004/0247246 A1 | 12/2004 | Lee et al. | |
| 2007/0147836 A1 | 6/2007 | Dong | |
| 2008/0095535 A1 | 4/2008 | Zou | |
| 2009/0274471 A1* | 11/2009 | Bowler et al. | 398/197 |
| 2010/0111532 A1* | 5/2010 | Chen et al. | 398/67 |
| 2012/0294609 A1* | 11/2012 | Leung et al. | 398/43 |

FOREIGN PATENT DOCUMENTS

| | | |
|---|---|---|
| CN | 1512686 A | 7/2004 |
| CN | 1761181 A | 4/2006 |
| CN | 1838548 A | 9/2006 |
| CN | 101001120 A | 7/2007 |
| CN | 101040472 A | 9/2007 |
| CN | 101729154 B | 4/2012 |
| JP | 2008017323 A | 1/2008 |
| WO | WO 2008/078819 A | 7/2008 |

OTHER PUBLICATIONS

International Search Report dated Sep. 3, 2009 in connection with International Patent Application No. PCT/CN2009/072054.

Supplementary European Search Report dated Aug. 23, 2012 in connection with EuropeanPatent Application No. EP 09 82 8556.

(Continued)

*Primary Examiner* — Dzung Tran

(74) *Attorney, Agent, or Firm* — Huawei Technologies Co., Ltd

(57) ABSTRACT

A method, device and system for implementing a long reach passive optical network (LR-PON) are provided, which solve the problem that the cost for establishing an LR-PON system is high. The method includes: receiving an uplink burst packet transmitted by an optical network unit (ONU) in a burst manner (101), converting a burst optical signal of the uplink burst packet into a continuous optical signal, and transmitting the continuous optical signal to a receiving device (105). The present invention is applicable to an LR-PON.

9 Claims, 3 Drawing Sheets

(56) References Cited

OTHER PUBLICATIONS

Hitoyuki Tagami, et al., "A Burst-Mode Bit-Synchronization IC With Large Tolerance for Pulse-Width Distortion for Gigabit Ethernet PON", IEEE Journal of Solid-State Circuit, vol. 41, No. 11, Nov. 2006, p. 2555-2565.

Written Opinion of the International Searching Authority dated Sep. 3, 2009 in connection with International Patent Application No. PCT/CN2009/072054.

"Series G: Transmission Systems and Media, Digital Systems and Networks, Digital section and digital line system—optical line syustems for local and access networks, Gigabit-capable passive optical networks (GPON): Reach extension", ITU-T G.984.6, Mar. 2008, 38 pages.

Translation of Office Action dated Nov. 2, 2010 in connection with Chinese Patent Application No. 200810226005.0.

Translation of Office Action dated Mar. 30, 2011 in connection with Chinese Patent Application No. 200810226005.0.

\* cited by examiner

METHOD, DEVICE, AND SYSTEM FOR IMPLEMENTING LR-PON

CROSS-REFERENCE TO RELATED APPLICATIONS

This application is a continuation of International Application No. PCT/CN2009/072054, filed on May 31, 2009, which claims priority to Chinese Patent Application No. 200810226005.0, filed on Nov. 3, 2008, both of which are hereby incorporated by reference in their entireties.

TECHNICAL FIELD

The present invention relates to the communication field, and more particularly to a method, device and system for implementing a long reach passive optical network (LR-PON).

BACKGROUND

The PON technology is a broadband optical access technology most widely applied at present. The conventional PON system includes an optical line terminal (OLT), a passive optical splitter, an optical network unit (ONU), a trunk fiber, and the like. The trunk fiber, the optical splitter, and a branch fiber between the OLT and the ONU are together called an optical distribution network (ODN). In the uplink direction, the ONU transmits uplink data in a burst mode and the OLT receives the uplink data in the burst mode. In the downlink direction, the OLT transmits downlink data in a continuous mode, and the ONU receives the downlink data in the continuous mode.

The conventional PON system covers a small range, so that a great number of OLTs are required to expand the coverage. Therefore, a solution of implementing LR-PON by using regenerator remote connection in an electrical relay manner is proposed in the prior art.

FIG. 1 illustrates basic architecture of a system for implementing LR-PON by using an optical-electrical-optical (OEO) relay device. A reamplifying, reshaping, retiming (3R) relay device is disposed between the optical splitter and the OLT to serve as a remote connection relay device between the OLT and the ONU for accomplishing reamplifying, reshaping, and retiming functions. The 3R device receives an uplink burst packet transmitted by the ONU in a burst manner, and transmits the uplink burst packet with aligned phases to the OLT in a "burst transmission" manner. Further, with the increase of the distance, a plurality of 3R relay devices may be disposed between the optical splitter and the OLT.

Because the 3R relay device transmits uplink data in the "burst transmission" mode, a receiving device has to receive the uplink data forwarded by the 3R relay device in a "burst reception" mode.

During the implementation of the present invention, the inventor finds that the prior art at least has the following problems.

The cost for the receiving device adopting the "burst reception" mode is high, which leads to the problem that the cost for establishing an LR-PON system is too high.

SUMMARY

In one aspect, an embodiment of the present invention provides a method for implementing LR-PON, so as to reduce the cost for establishing an LR-PON system.

To achieve the objective, the embodiment of the present invention adopts the following technical solution:

A method for implementing LR-PON includes:

receiving an uplink burst packet transmitted by an ONU in a burst manner;

converting a burst optical signal of the uplink burst packet into a continuous optical signal; and transmitting the continuous optical signal to a receiving device.

In another aspect, an embodiment of the present invention provides a device for implementing LR-PON, so as to reduce the cost for establishing an LR-PON system.

In order to achieve the objective, the embodiment of the present invention adopts the following technical solution:

A device for implementing LR-PON includes:

a receiving unit, configured to receive an uplink burst packet transmitted by an ONU in a burst manner;

a conversion unit, configured to convert a burst optical signal of the uplink burst packet into a continuous optical signal; and a transmission unit, configured to transmit the continuous optical signal to a receiving device.

In another aspect, an embodiment of the present invention provides a system for implementing LR-PON, so as to reduce the cost for establishing an LR-PON system.

To achieve the objective, the embodiment of the present invention adopts the following technical solution:

A system for implementing LR-PON includes:

an ONU, configured to transmit an uplink burst packet in a burst manner;

a relay device, configured to receive the uplink burst packet transmitted by the ONU in a burst manner, convert a burst optical signal of the uplink burst packet into a continuous optical signal, and transmit the continuous optical signal to a receiving device; and the receiving device, configured to receive the continuous optical signal forwarded by the relay device.

In the method, device, and system for implementing LR-PON according to embodiments of the present invention, an uplink burst packet transmitted by an ONU is received in a burst manner, a burst optical signal of the uplink burst packet is converted into a continuous optical signal, and the continuous optical signal is transmitted to a receiving device. In this way, the receiving device can receive the optical signal in a "continuous reception" mode that requires a low cost and is simple for implement, so as to reduce the cost for establishing an LR-PON system and simplify the implementation of the LR-PON system.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION

The technical solutions of the present invention will be clearly and completely described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 5:
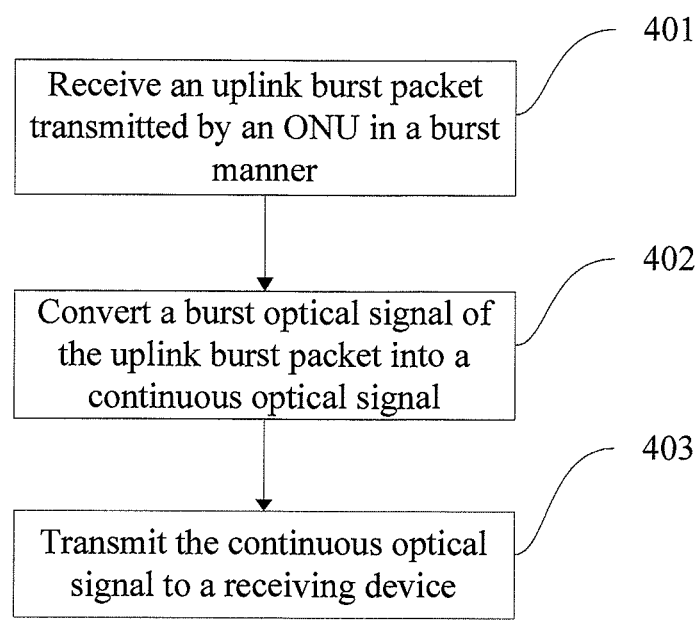
FIG. 5 is a schematic diagram of a method for implementing LR-PON according to an embodiment of the present invention.

An embodiment of the present invention provides a method for implementing LR-PON. As shown in FIG. 5, the method for implementing LR-PON according to the embodiment of the present invention includes the following steps:

401: A 3R relay device receives an uplink burst packet transmitted by an ONU in a burst manner.

402: The 3R relay device converts a burst optical signal of the uplink burst packet into a continuous optical signal.

Specifically, the 3R relay device may adjust optical power of the burst optical signal of the uplink burst packet, convert the adjusted optical signal into an electrical signal, amplify and shape the electrical signal, perform clock data recovery on the amplified and shaped electrical signal, convert the electrical signal after the clock data recovery into the continuous optical signal, and amplify the continuous optical signal.

403: The 3R relay device transmits the continuous optical signal to a receiving device.

In the method for implementing LR-PON according to the embodiment of the present invention, an uplink burst packet transmitted by an ONU is received in a burst manner, a burst optical signal of the uplink burst packet is converted into a continuous optical signal, and the continuous optical signal is transmitted to a receiving device. In this way, the receiving device can receive the optical signal in a "continuous reception" mode that requires a low cost and is simple to implement, so as to reduce the cost for establishing an LR-PON system and simplify the implementation of the LR-PON system.

Figure 1:
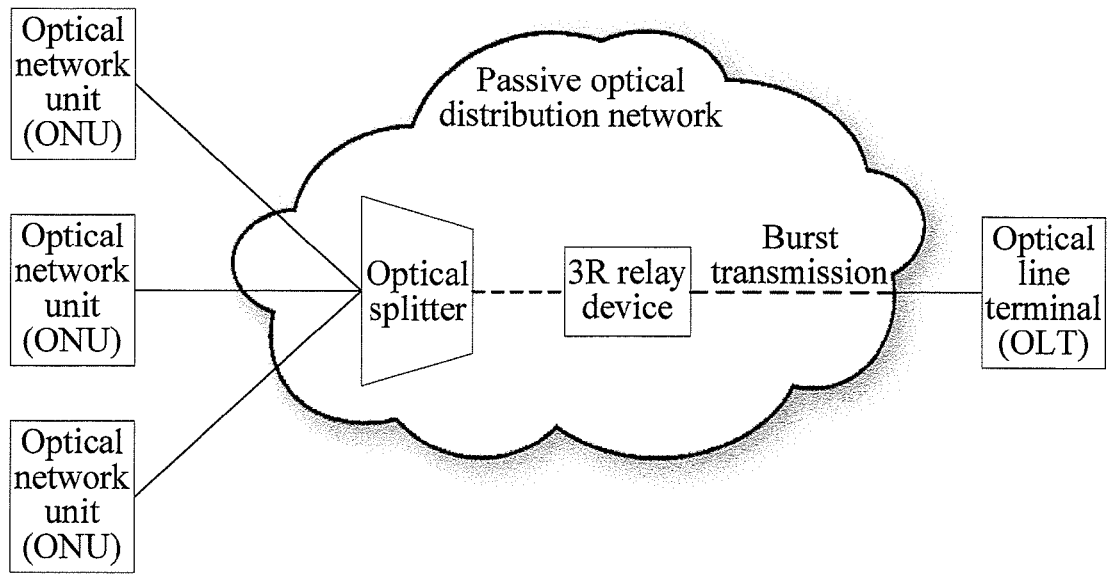
FIG. 1 is a basic architecture diagram of an LR-PON system according to the prior art.
Figure 2:
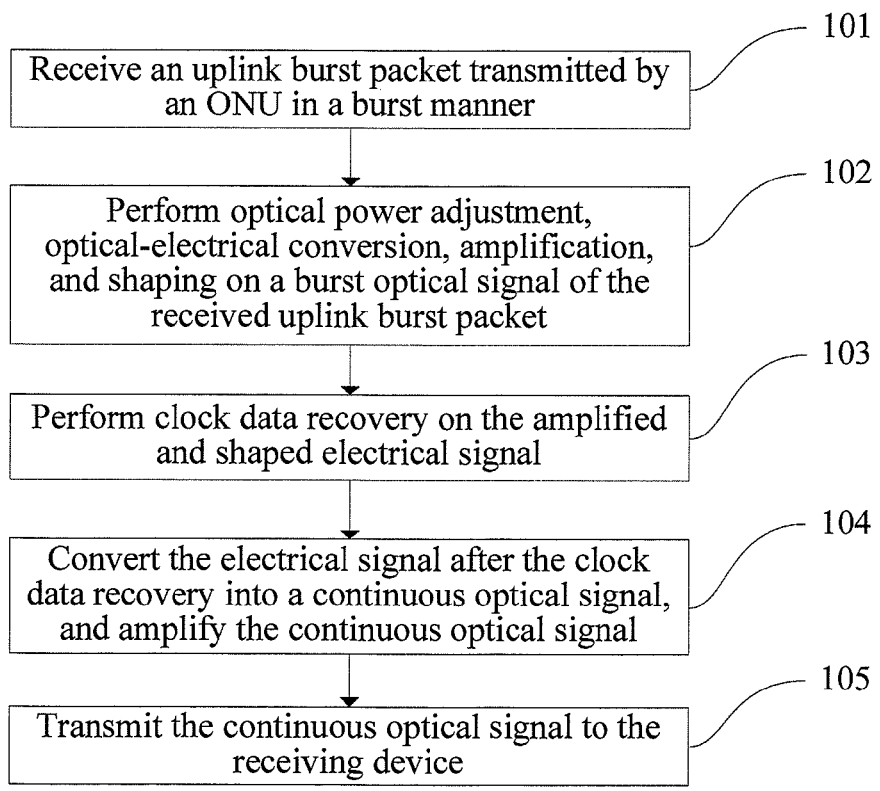
FIG. 2 is a schematic diagram of a method for implementing LR-PON according to an embodiment of the present invention.

To reduce the cost for establishing an LR-PON system, an embodiment of the present invention provides a method for implementing LR-PON. As shown in FIG. 2, the method for implementing LR-PON according to the embodiment of the present invention includes the following steps:

101: A 3R relay device receives an uplink burst packet transmitted by an ONU in a burst manner.

During the specific application, the 3R relay device may receive the uplink burst packet transmitted by the ONU in a burst manner after receiving a reset signal.

102: The 3R relay device adjusts optical power of a burst optical signal of the received uplink burst packet, converts the adjusted optical signal into an electrical signal, and amplifies and shapes the electrical signal.

103: The 3R relay device performs clock data recovery on the amplified and shaped electrical signal.

A reference clock used in the clock data recovery is a downlink retiming clock generated by the 3R relay device, and the 3R relay device converts a continuous downlink optical signal received from a receiving device into an electrical signal, amplifies and shapes the electrical signal, so the downlink retiming clock is recovered from the amplified and shaped electrical signal. The downlink retiming clock is used to perform clock data recovery on the uplink signals, so that clock phases become more stable and phases of the uplink burst packets are uniform after the uplink signals pass through the 3R device, so that the receiving device can better receive the uplink signals.

104: The 3R relay device converts the electrical signal after the clock data recovery into a continuous optical signal, and amplifies the continuous optical signal.

In addition, in order to avoid the difficulty of the clock data recovery in the reception of the receiving device caused by long 0 and long 1 that appear in the continuous signal output by the 3R relay device, the 3R relay device, before converting the electrical signal after the clock data recovery into the continuous optical signal, may further determine an inter-packet gap between the uplink burst packet and a next adjacent burst packet and fill non-Consecutive Identical Digits (non-CID) bit information in the inter-packet gap, that is, the length of continuous 0 or 1 in the bit information does not exceed the clock data recovery capability of the receiving device, which can be implemented through the following process.

First, an end position of the uplink burst packet and a start position of the next adjacent burst packet are obtained respectively. For example, the end position of the uplink burst packet may be detected with a burst packet trailer detection technology, and the start position of the next adjacent burst packet may be found with a bit delimiter technology. Then, the inter-packet gap between the two adjacent burst packets is determined according to the end position of the uplink burst packet and the start position of the next adjacent burst packet. To achieve a butter filling effect, a byte rounding operation may be further performed on the inter-packet gap when the inter-packet gap between the two adjacent burst packets is determined. Finally, the inter-packet gap between the two adjacent burst packets is filled with effective non-CID bit information, for example, 0xCC.

When the 3R relay device detects the end position of the uplink burst packet, a receiving unit and a clock data recovery unit of the 3R relay device receive a reset signal respectively. The receiving unit continues to receive a next uplink burst packet transmitted by the ONU in a burst manner according to the received reset signal, and the clock data recovery unit performs clock data recovery on the amplified and shaped electrical signal according to the received reset signal.

105: The 3R relay device transmits the continuous optical signal to the receiving device.

The 3R relay device transmits the continuous optical signal to the receiving device in a "continuous transmission" mode, and the receiving device also receives the continuous optical signal in a "continuous reception" mode.

The receiving device may be a 3R relay device which adopts a "continuous reception" mode-"continuous transmission" mode, a 3R relay device which adopts a "continuous reception" mode-"burst transmission" mode, or an OLT which adopts a "continuous reception" mode.

In the method for implementing LR-PON according to the embodiment of the present invention, an uplink signal is transmitted in a "continuous transmission" mode in the 3R relay device, so that the receiving device can receive an optical signal in a "continuous reception" mode that requires a low cost and is simple to implement, which causes no damage to the uplink signal and helps to bear multiple PONs by using a wavelength division multiplexing (WDM) network, so as to save the fiber cost and reduce the cost of the LR-PON system, thereby simplifying the implementation of the LR-PON system.

Figure 3:
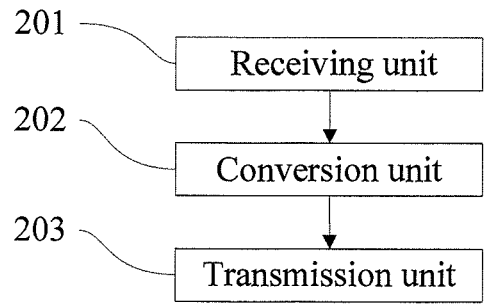
FIG. 3 is a structure diagram of a device for implementing LR-PON according to an embodiment of the present invention.

An embodiment of the present invention further provides a device for implementing LR-PON. As shown in FIG. 3, the device for implementing LR-PON according to the embodiment of the present invention includes a receiving unit 201, a conversion unit 202, and a transmission unit 203.

The receiving unit 201 is configured to receive an uplink burst packet transmitted by an ONU in a burst manner.

The conversion unit 202 is configured to convert a burst optical signal of the uplink burst packet into a continuous optical signal.

The transmission unit 203 is configured to transmit the continuous optical signal to a receiving device.

Figure 6:
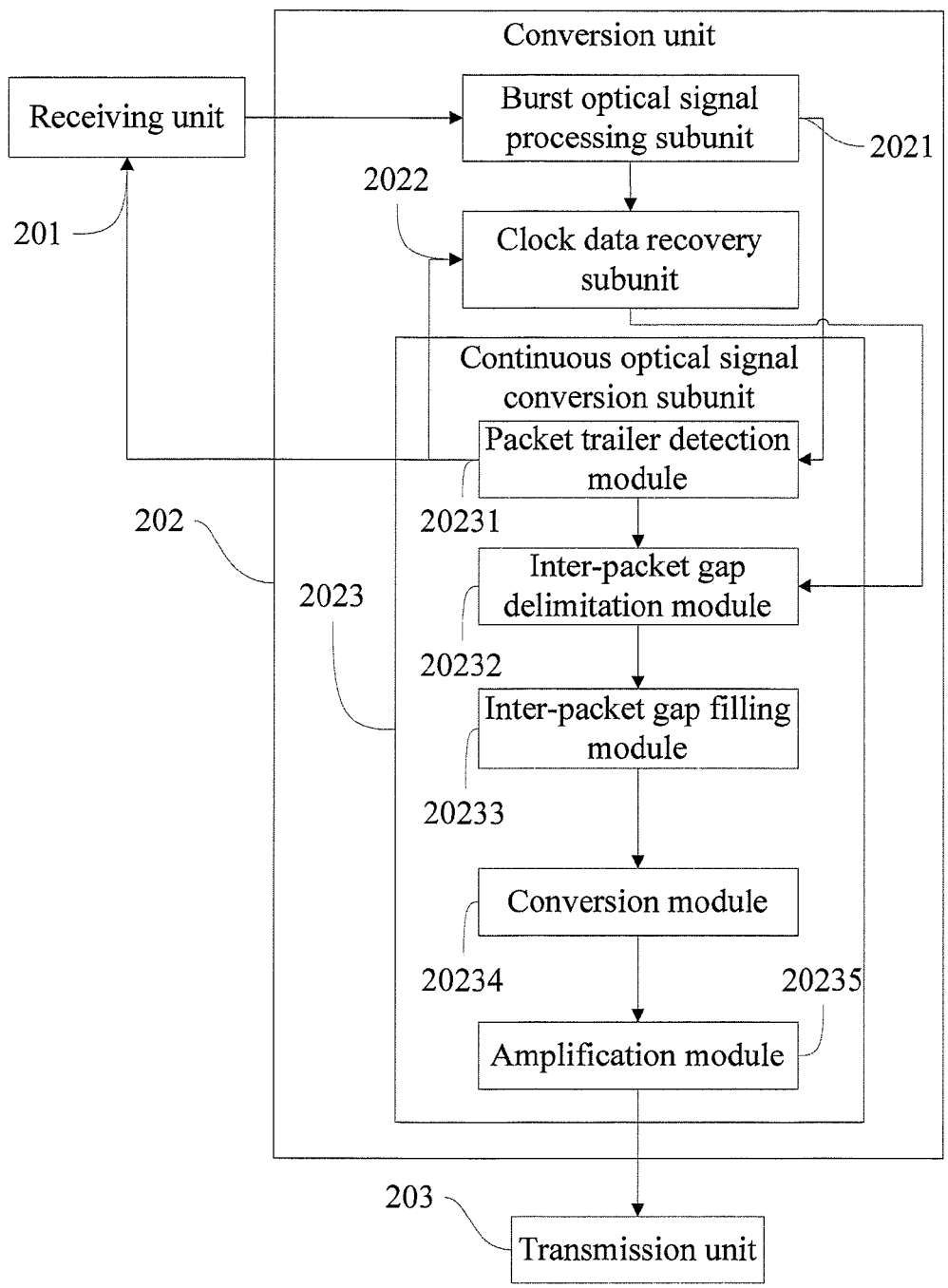
FIG. 6 is a structure diagram of a device for implementing LR-PON according to an embodiment of the present invention.

Further, as shown in FIG. 6, the conversion unit 202 specifically includes a burst optical signal processing subunit 2021, a clock data recovery subunit 2022, and a continuous optical signal conversion subunit 2023.

The burst optical signal processing subunit 2021 is configured to adjust optical power of the burst optical signal of the uplink burst packet received by the receiving unit 201, convert the adjusted optical signal into an electrical signal, and amplify and shape the electrical signal.

The clock data recovery subunit 2022 is configured to perform clock data recovery on the electrical signal output by the burst optical signal processing subunit 2021.

The continuous optical signal conversion subunit 2023 is configured to convert the electrical signal output by the clock data recovery subunit 2022 into the continuous optical signal, and amplify the continuous optical signal.

In addition, the continuous optical signal conversion subunit 2023 further includes a conversion module 20234 and an amplification module 20235. The conversion module 20234 is configured to convert the received electrical signal into the continuous optical signal. The amplification module 20235 is configured to amplify the continuous optical signal.

In order to avoid the difficulty of the clock data recovery in the reception of the receiving device caused by long 0 and long 1 that appear in the continuous signal output by the transmission unit 203, a packet trailer detection module 20231, an inter-packet gap delimitation module 20232, and an inter-packet gap filling module 20233 may be added in the continuous optical signal conversion subunit 2023.

The packet trailer detection module 20231 is configured to detect an end position of the uplink burst packet received by the receiving unit 201, and transmit information about the end position of the uplink burst packet to the inter-packet gap delimitation module 20232 when detecting the end position of the uplink burst packet.

Moreover, the packet trailer detection module 20231 further transmits a reset signal to the receiving unit 201 and the clock data recovery subunit 2022 respectively when detecting the end position of the uplink burst packet. The receiving unit 201 continues to receive a next uplink burst packet transmitted by the ONU in a burst manner according to the received reset signal. The clock data recovery subunit 2022 performs clock data recovery on the electrical signal according to the received reset signal.

The inter-packet gap delimitation module 20232 is configured to determine an inter-packet gap between the uplink burst packet and a next adjacent burst packet and perform byte rounding on the inter-packet gap by receiving the information about the end position of the uplink burst packet transferred by the packet trailer detection module 20231 and obtaining the start position of the next adjacent burst packet.

The inter-packet gap filling module 20233 is configured to fill non-CID bit information in the inter-packet gap determined by the inter-packet gap delimitation module 20232 and transfer the optical signal having the packet gap filled with the non-long 0 long 1 bit information to the transmission unit 203. The length of continuous 0 or 1 in the filled bit information does not exceed the clock data recovery capability of the receiving device.

In the device for implementing LR-PON according to the embodiment of the present invention, an optical signal of an uplink burst packet received in a burst manner is converted into a continuous electrical signal, and the continuous electrical signal is transmitted to a receiving device, so that the receiving device can receive the optical signal in a "continuous reception" mode that requires a low cost and is simple to implement, which causes no damage to the uplink signal and helps to bear multiple PONs by using a WDM network, so as to save the fiber cost and reduce the cost of the LR-PON system, thereby simplifying the implementation of the LR-PON system.

Figure 4:
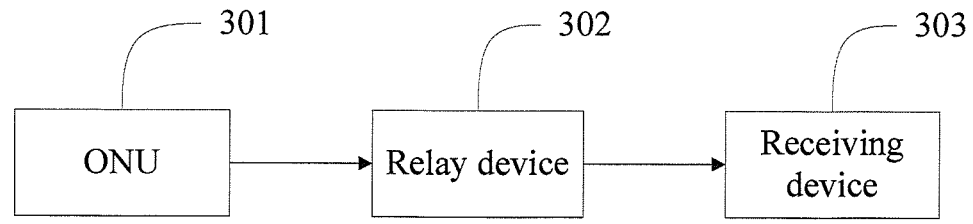
FIG. 4 is a structure diagram of a system for implementing LR-PON according to an embodiment of the present invention.

An embodiment of the present invention further provides a system for implementing LR-PON. As shown in FIG. 4, the device for implementing LR-PON according to the embodiment of the present invention includes an ONU 301, a relay device 302, and a receiving device 303.

The ONU 301 is configured to transmit an uplink burst packet to a relay device in a burst manner.

The relay device 302 is configured to receive the uplink burst packet transmitted by the ONU 301 in a burst manner, convert a burst optical signal of the uplink burst packet into a continuous optical signal, and transmit the continuous optical signal to a receiving device 303.

Further, the relay device 302 is specifically configured to receive the uplink burst packet transmitted by the ONU 301 in a burst manner, adjust optical power of a burst optical signal of the uplink burst packet, convert the adjusted optical signal into an electrical signal, amplify and shape the electrical signal, perform clock data recovery on the amplified and shaped electrical signal, convert the electrical signal after the clock data recovery into a continuous optical signal, amplify the continuous optical signal, and transmit the continuous optical signal.

The receiving device 303 is configured to receive the continuous optical signal forwarded by the relay device 302.

The receiving device 303 is a 3R relay device or an OLT.

In the system for implementing LR-PON according to the embodiment of the present invention, the 3R relay device receives an uplink burst packet from an ONU in a burst manner, converts a burst optical signal of the uplink burst packet into a continuous optical signal, and transmits the continuous optical signal to a receiving device, so that the receiving device can receive the optical signal in a "continuous reception" mode that requires a low cost and is simple to implement, which causes no damage to the uplink signals and helps to bear multiple PONs by using a WDM network, so as to save the fiber cost and reduce the cost of the LR-PON system, thereby simplifying the implementation of the LR-PON system.

Persons of ordinary skill in the art should understand that all or a part of the procedures of the method according to the embodiments of the present invention may be implemented by a computer program instructing relevant hardware. The program may be stored in a computer readable storage medium. When the program is run, the procedures of the methods according to the embodiments of the present invention are performed. The storage medium may be a magnetic disk, an optical disk, a Read-Only Memory (ROM), a Random Access Memory (RAM), and the like.

The above are merely specific embodiments of the present invention, but the protection scope of the present invention is not limited thereto. Any variations or replacements that can be easily thought of by persons skilled in the art in the technical scope of the present invention shall fall within the protection scope of the present invention. Therefore, the protection scope of the present invention shall be as defined by the claims.

What is claimed is:

1. A method for processing uplink burst packets in a long reach passive optical network (LR-PON), comprising:
   receiving the uplink burst packets transmitted by an optical network unit (ONU) in a burst manner;
   converting a burst optical signal of the uplink burst packets into a continuous optical signal; and
   transmitting the continuous optical signal to a receiving device,
   wherein the converting the burst optical signal of the uplink burst packets into the continuous optical signal comprises:
      adjusting an optical power of the burst optical signal to obtain an adjusted optical signal, and converting the adjusted optical signal into an electrical signal;
      amplifying and shaping the electrical signal to obtain an amplified and shaped electrical signal;
      performing a clock data recovery on the amplified and shaped electrical signal to obtain a clock data recovered electrical signal; and
      converting the clock data recovered electrical signal into the continuous optical signal; and wherein the step of converting the clock data recovered electrical signal into the continuous optical signal comprises:
      determining an inter-packet gap between a clock data recovered electrical signal of a uplink burst packet and a clock data recovered electrical signal of a next adjacent uplink burst packet;
      filling the inter-packet gap with non-Consecutively Identical Digits (non-CID) bit or bits to obtain a continuous clock data recovered electrical signal; and
      converting the continuous clock data recovered electrical signal into a converted optical signal, and amplifying the converted optical signal to obtain the continuous optical signal.

2. The method according to claim 1, wherein the determining the inter-packet gap comprises:
   obtaining an end position of the clock data recovered electrical signal of the uplink burst packet;
   obtaining a start position of the clock data recovered electrical signal of the next adjacent burst packet; and
   determining the inter-packet gap according to the end position and the start position.

3. The method according to claim 2, wherein the obtaining the end position of the clock data recovered electrical signal of the uplink burst packet comprises:
   obtaining the end position by means of a burst packet trailer detection; and
   wherein the obtaining the start position of the clock data recovered electrical signal of the next adjacent uplink burst packet comprises:
   obtaining the start position by means of a bit delimiter.

4. The method according to claim 1, wherein when the inter-packet gap is determined, the method further comprises:
   performing a byte rounding operation on the inter-packet gap.

5. A device for processing uplink burst packets in a long reach passive optical network (LR-PON), comprising:
   a receiver, configured to receive the uplink burst packets transmitted by an optical network unit (ONU) in a burst manner;
   a processor, configured to convert a burst optical signal of the uplink burst packet into a continuous optical signal; and
   a transmitter, configured to transmit the continuous optical signal to a receiving device,
   wherein in converting the burst optical signal of the uplink burst packets into the continuous optical signal, the processor is configured to:
      adjust an optical power of the burst optical signal to obtain an adjusted optical signal, and convert the adjusted optical signal into an electrical signal;
      amplify and shape the electrical signal to obtain an amplified and shaped electrical signal;
      perform a clock data recovery on the amplified and shaped electrical signal to obtain a clock data recovered electrical signal; and
      convert the clock data recovered electrical signal into the continuous optical signal;
   and wherein in converting the clock data recovered electrical signal into the continuous optical signal, the processor is configured to:
      determine an inter-packet gap between a clock data recovered electrical signal of a uplink burst packet and a clock data recovered electrical signal of a next adjacent uplink burst packet;
      fill the inter-packet gap with non-Consecutively Identical Di its non-CID bit or bits to obtain a continuous clock data recovered electrical signal; and
      convert the continuous clock data recovered electrical signal into a converted optical signal, and amplify the converted optical signal to obtain the continuous optical signal.

6. The device according to claim 5, wherein in determining the inter-packet gap, the processor is configured to:
   obtain an end position of the clock data recovered electrical signal of the uplink burst packet;
   obtain a start position of the clock data recovered electrical signal of the next adjacent uplink burst packet; and
   determine the inter-packet gap according to the end position and the start position.

7. The device according to claim 6, wherein in obtaining the end position of the clock data recovered electrical signal of the uplink burst packet, the processor is configured to:
   obtain the end position by means of a burst packet trailer detection;
   and wherein in obtaining the start position of the clock data recovered electrical signal of the next adjacent uplink burst packet, the processor is configured to:
   obtain the start position by means of a bit delimiter.

8. A system for processing uplink burst packets in a long reach passive optical network (LR-PON), comprising an optical network unit (ONU), a relay device and a receiving device, wherein:
   the ONU is configured to transmit uplink burst packets to the relay device in a burst manner;
   the relay device is configured to convert a burst optical signal of the uplink burst packets into a continuous optical signal, and transmit the continuous optical signal to the receiving device; and
   the receiving device is configured to receive the continuous optical signal;
   wherein in converting the burst optical signal into the continuous optical signal, the relay device is configured to:

adjust an optical power of the burst optical signal to obtain an adjusted optical signal, and convert the adjusted optical signal into an electrical signal;

amplify and shape the electrical signal to obtain an amplified and shaped electrical signal;

perform a clock data recovery on the amplified and shaped electrical signal to obtain a clock data recovered electrical signal; and convert the clock data recovered electrical signal into the continuous optical signal;

and wherein in converting and the clock data recovered electrical signal into the continuous optical signal, the relay device is configured to:

determine an inter-packet gap between a clock data recovered electrical signal of a uplink burst packet and a clock data recovered electrical signal of a next adjacent uplink burst packet;

fill the inter-packet gap with non-Consecutively Identical Digits (non-CID) bit or bits to obtain a continuous clock data recovered electrical signal; and convert the continuous clock data recovered electrical signal into a converted optical signal, and amplify the converted optical signal to obtain the continuous optical signal.

9. The system according to claim 8, wherein the receiving device is a reamplifying, reshaping, retiming (3R) device or an optical line terminal (OLT).

* * * * *